United States Patent [19]

Okuno

[11] Patent Number: 4,581,523

[45] Date of Patent: Apr. 8, 1986

[54] APPARATUS FOR SENSING A MAGNETIC STRIPE ON A RECORDING MEDIA

[75] Inventor: Hiroyuki Okuno, Nagaokakyo, Japan

[73] Assignee: Omron Tateisi Electronics Co., Japan

[21] Appl. No.: 504,452

[22] Filed: Jun. 15, 1983

Related U.S. Application Data

[63] Continuation-in-part of Ser. No. 489,109, Apr. 27, 1983, abandoned.

[30] Foreign Application Priority Data

Apr. 30, 1982 [JP] Japan ................................ 57-63998
Oct. 18, 1982 [JP] Japan ............................... 57-183187

[51] Int. Cl.[4] .......................................... G06K 13/04
[52] U.S. Cl. .................................. 235/479; 235/449; 235/482; 360/2; 360/81
[58] Field of Search ............... 235/449, 453, 479, 482; 360/2, 81

[56] References Cited

U.S. PATENT DOCUMENTS

3,766,687 10/1973 Henson ............................. 235/482 X
4,149,669  4/1979 Hermstein et al. .............. 235/449 X
4,197,988  4/1980 Moss et al. ........................... 235/449
4,280,036  7/1981 Fukatsu ................................ 235/379

Primary Examiner—David L. Trafton
Attorney, Agent, or Firm—Wegner & Bretschneider

[57] ABSTRACT

An apparatus for sensing a magnetic stripe disposed on a card which is inserted in the apparatus in a direction perpendicular to the stripe includes a magnetic head, a head supporting member for supporting the head for movement having a component in parallel with the stripe, and a mechanism for driving the head supporting member in response to the insertion of the card so as to move the head along the stripe of the moving card, whereby the stripe of the card which is inserted into the apparatus in a direction perpendicular to the stripe is sensed by the head.

16 Claims, 11 Drawing Figures

APPARATUS FOR SENSING A MAGNETIC STRIPE ON A RECORDING MEDIA

This is a continuation-in-part of Ser. No. 489,109, filed Apr. 27, 1983, now abandoned.

BRIEF SUMMARY OF THE INVENTION

This invention relates to an apparatus for sensing a magnetic stripe disposed on a flat-shaped recording medium, such as a magnetic card or a passbook, and more particularly to an apparatus for sensing if a predetermined recording magnetic stripe is present on a flat-shaped recording media externally inserted into the apparatus.

The conventional card receiving apparatus employed in an automatic teller machine is well known which includes a magnetic stripe sensor a which reads whether or not a bank card inserted into the machine by a customer carries predetermined data on a magnetic stripe disposed on the card, a shutter adapted to be opened to pass the card therethrough when the predetermined data is read out by the magnetic stripe sensor, and a card reader for reading further predetermined data or card data recorded on the magnetic stripe of the card passed from the shutter. In order to protect the card reader from any foreign matter or any false card being conveyed to the reader, the shutter is normally closed.

Thus, the determination of whether or not predetermined data is recorded on a magnetic stripe disposed on the card, viz., whether or not the card is genuine, is sensed by the magnetic stripe sensor which includes a stationary magnetic head for reading the data on the magnetic stripe. All magnetic data or card data, however, are recorded on the stripe in a longitudinal direction where magnetic flux changes are formed, so that the card inserted within the conventional card receiving apparatus is conveyed in the longitudinal direction of the stripe so as to be read out by the magnetic stripe sensor and the card reader. Since the magnetic stripe cannot be read out in a direction perpendicular to the longitudinal direction of the stripe, the card must be inserted in the longitudinal direction of the stripe into the conventional card receiving apparatus of the automatic teller machine, so that the conventional apparatus cannot comply with the requirement of allowing the card to be inserted into the apparatus in a direction perpendicular to the longitudinal direction of the magnetic stripe.

It is, therefore, a primary object of this invention to provide an apparatus capable of sensing a predetermined magnetic stripe disposed on a flat-shaped recording medium inserted into the apparatus in a direction perpendicular to the longitudinal direction of the magnetic stripe.

It is a further object of this invention to provide an apparatus including a moving magnetic head provided with a movement component along a longitudinal direction of the predetermined stripe so as to read out magnetic flux changes formed in the longitudinal direction thereof.

It is another object of this invention to provide an improved apparatus with a simplified construction for sensing a magnetic stripe on a recording media externally inserted perpendicular to the stripe direction by scanning a part of the stripe prior to reading out substantial data on the stripe by scanning whole part of the stripe in another succeeding mechanical section.

According to one aspect of this invention, there is provided an apparatus for sensing a magnetic stripe disposed on a flat-shaped recording medium which is inserted into the apparatus in a direction perpendicular to the stripe, which includes a magnetic head member, supporting means for supporting the magnetic head member for movement having a component perpendicular to the direction of the insertion of the recording medium into the apparatus, and driving means in response to the insertion of the recording medium for moving the supporting means so as to move the magnetic head member along the stripe so that the magnetic head member scans the magnetic stripe at least in part thereof to sense the presence of the stripe.

Other objects as well as the numerous advantages of the apparatus for sensing a magnetic stripe according to this invention will become apparent from the following detailed description and the accompanying drawings, in which:

DETAILED DESCRIPTION

Figure 1:
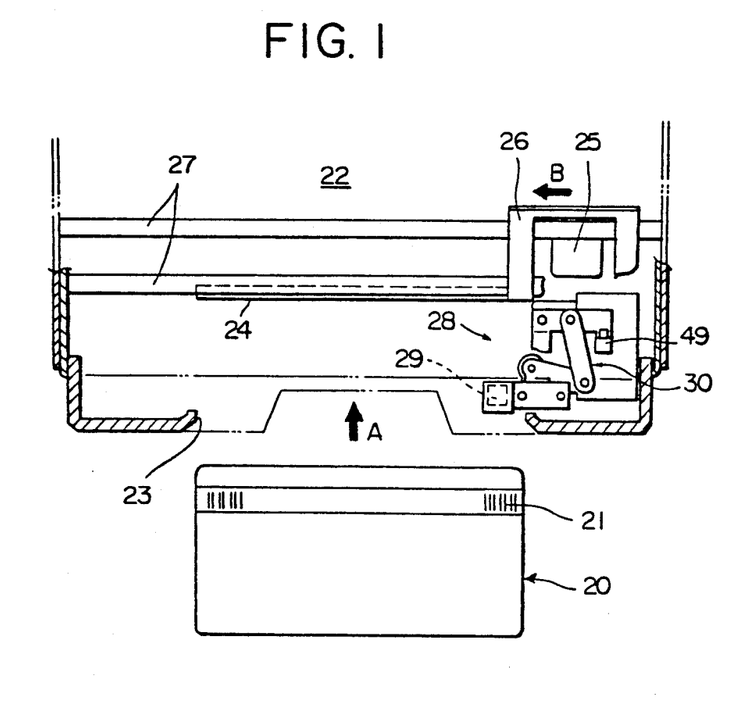
FIG. 1 is a sectional partial schematic plan view of an apparatus for sensing a magnetic stripe on a recording medium as a preferred first embodiment of this invention.

Referring, now, to FIG. 1, there is shown an apparatus 22 for sensing a magnetic stripe 21 disposed on a flat-shaped recording medium 20, as a first embodiment of this invention. The recording medium 20 may be a conventional plastic or paper card, such as a bank transaction card, a personal credit card, a gate entry card or so forth, or a passbook, on an external surface of which there is disposed the magnetic stripe. For easy explanation of this embodiment, a conventional magnetic card is exemplarily illustrated as the recording medium 20 in FIG. 1, but another recording medium may be employed instead. The magnetic stripe 21 is formed on a surface of the card 20 along a side of the same, on which predetermined card data is recorded in the longitudinal direction of the stripe 21 as illustrated in FIG. 1. Predetermined invisible magnetic bar codes are formed as illustrated in FIG. 1, and magnetic flux changes may be sensed in the longitudinal direction of the stripe 21. The card 20 is externally inserted into the apparatus 22 in a direction A perpendicular to the longitudinal direction of the stripe 21 as illustrated in FIG. 1.

The apparatus 22 in a front portion thereof includes an inlet 23 for accepting a predetermined size card. A shutter 24 is disposed within the apparatus 22, and normally closed so as to block a path for the movement of the inserted card within the apparatus 22. Between the inlet 23 and the shutter 24 there is provided a magnetic stripe sensing mechanism section 28 including a moving magnetic head 29 and a lever driving mechanism 30 so that the head 29 scans the stripe 21 as the card 20 has been inserted while it is blocked by the shutter 24. A signal processing electronic circuit (not shown in drawings) is connected with the head 29 such that, as predetermined data, practically several signal pulses, is read by the head 29, the electronic circuit generates a stripe signal representing that the inserted card contains a predetermined stripe. Though described later in detail, the electronic circuit is connected with a Hall element 49 for generating a proper size signal representing that the inserted card is in a predetermined size. When the stripe signal and the proper size signal are generated, the circuit generates a genuine signal for application to a driving device (not shown in drawings) for driving the shutter 24. Thus, as the inserted card 20 is judged as genuine by the circuit connected with the head 29 and the element 49, the shutter 24 is opened by the driving device associated with the circuit so as to allow the card 20 to pass the shutter 24.

At the back of the shutter 24, a moving magnetic head 25 for reading the card data on the stripe 21 is disposed for a horizontal movement B along a pair of guide rods 27. The head 25 is fixed to a movable block 26 which is movably supported by the rods 27 and driven by a controller (not shown in drawings) to allow the head 25 to scan the stripe 21 so as to read or write predetermined card data thereon.

Figure 2:
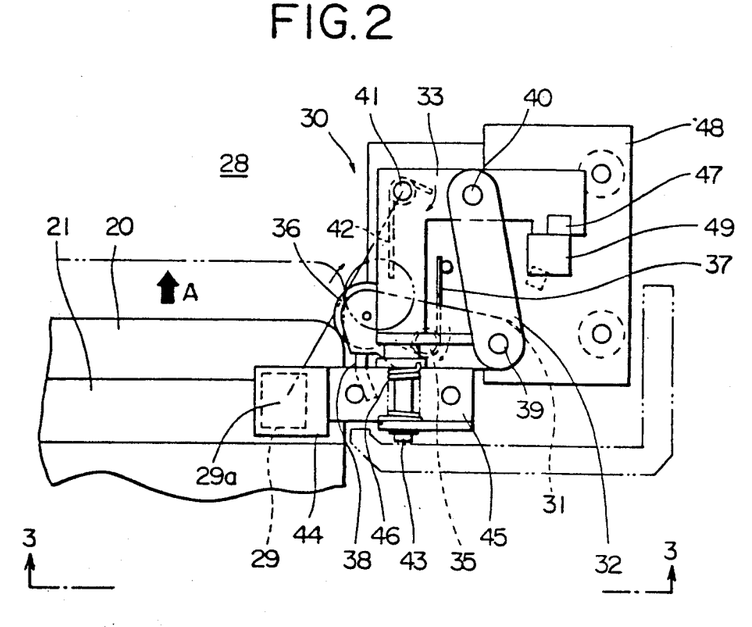
FIG. 2 is an enlarged plan view of a magnetic stripe sensing mechanism section employed in the apparatus of FIG. 1.
Figure 3:
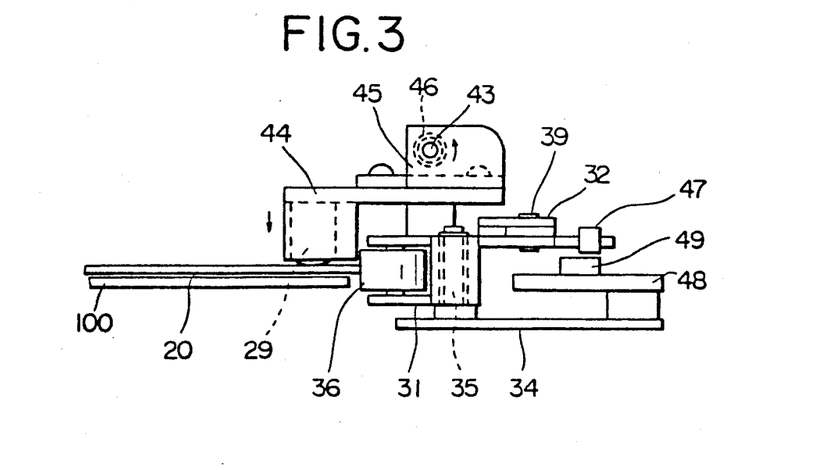
FIG. 3 is a front elevational view of the mechanism section viewed from the line 3—3 in FIG. 2.
Figure 4:
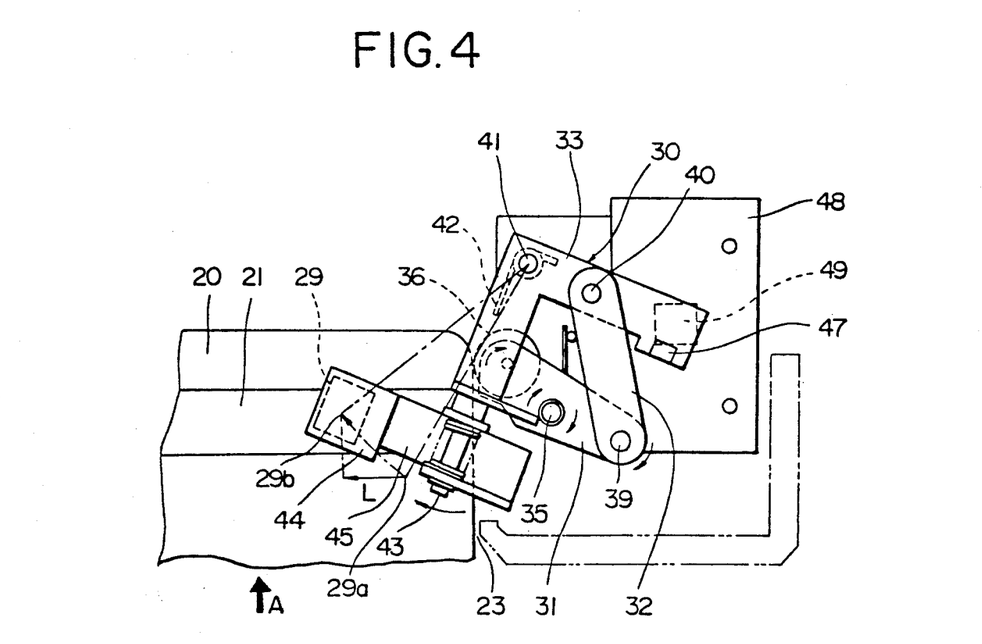
FIG. 4 is a partial plan view for illustrating the operations in the mechanism section of FIG. 2.

Referring to FIG. 2, there is shown in detail the magnetic stripe sensing mechanism section 28 in an initial position where the lever driving mechanism 30 is not yet actuated by the card 20. FIG. 3 illustrates a front elevational view of the mechanism section 28 viewed from the line 3—3 in FIG. 2. FIG. 4 illustrates the mechanism section 28 in an actuated position where the head 29 is moved by the lever driving mechanism 30 in response to the entry of the card 20 to a certain extent. The lever driving mechanism 30 includes a first lever 31, a second lever 32, and a third lever 33. The first lever 31 at a central portion thereof is swingably supported by a shaft 35 standing on a base 34, and at a free end thereof carries a roller 36 which is biased by a spring 37 engaged with the lever 31 so as to come within an entry path of the card 20 while its position is restricted by a stopper 38 (see FIG. 2). As the card 20 is manually inserted by a user through the inlet 23 to a certain extent (see FIG. 4), the roller 36 is driven backward by a peripheral side of the card 20, so that the lever 31 swings clockwise.

The other end of the lever 31 is engaged with one end of the second lever 32 through a movable connector 39 for a relative movement with respect to each other. The other end of the second lever 32 is engaged with the third lever 33 through a connector 40 to transfer the movement of the lever 31 to the third lever 33. The lever 33 is of an L-shaped form, and swingably supported by a shaft 41 standing on the base 34. The lever 33 is biassed by a resetting spring 42 to its original position, and at a free end thereof carries a shaft 43.

Thus, in response to the backward movement of the roller 36 by the card 20, the first lever 31 is rotated clockwise, the second lever 32 is moved frontward, and the third lever 33 is rotated clockwise, so that the shaft 43 moves for an arc movement providing for a movement component in parallel with the stripe 21.

The above-mentioned head 29 is fixed to a holder 44 fixed to a vertically swingable member 45. The member 45 is swingably supported by the shaft 43, and biassed by a spring 46 so as to bias the head 29 toward a surface of the card 20.

A permanent magnet 47 is fixed to the third lever 33. The above-mentioned Hall element 49 is mounted on a base board 48 fixed to the base 34 in a position corresponding to a moving trace of the magnet 47 in accordance with the movement of the roller 36. The Hall element 49 is adapted to be actuated when a card having a predetermined length in the longitudinal direction has been inserted, and not actuated when a card shorter than the predetermined length has been inserted because such a short card cannot provide the third lever 33 with an enough movement to actuate the element 49 by the magnet 47, so that Hall element 49 senses whether or not the inserted card 20 has a predetermined length.

Thus, as illustrated in FIGS. 3 and 4, when the card 20 has been inserted, the roller 36 is moved so as to swing the head 29 by the movement of the levers 31, 32 and 33 and the members 43, 45 and 44, so that the head 29 swings from a position 29a to a position 29b about the shaft 41 providing a moving component or travel L in parallel with the stripe 21 so as to sense flux changes on the stripe 21 by scanning the same within the travel L. Since the distance between shaft 41 and head 29 is designed to be longer than that between shaft 41 and connector 40, the movement of head 29 is amplified to be large in spite of a short movement of the first lever 31. The inserted card 20 is supported by a guide member 100 and biassed by the head 29 in cooperation with the spring 46 toward the member 100, so that even a curved card can be read out by the head 29 scanning the magnetic stripe.

The Hall element 49 is connected to the above-mentioned signal processing electronic circuit coupled to the head 29. As the inserted card 20 is sensed through the element 49 to be a proper size card and through the head 29 to have predetermined stripe data on the stripe 21, the normally-closed shutter 24 (see FIG. 1) is opened by the above-mentioned driving device associated with the electronic circuit. Then, the card 20 is conveyed through the shutter 24 and stripe 21 is scanned by the head 25 whereby predetermined card data is read out from the card or new data written onto the same.

Since the head 29 is moved by the forward movement of the card 20, it does not require any head driving motor, so that the apparatus according to this embodiment can have a simplified construction and is economical. Though the card 20 is manually inserted in this embodiment, it may be conveyed by additional motor driven rollers from the inlet 23 to the shutter 24, if required. Since the reading or scanning by the head 29 is much simpler than that by the head 25 and the head 29 is much cheaper than the head 25, repair work on the head 29 is easy, so that even if any wrong materials damaging to a magnetic head are inserted into the apparatus, the complicated head 25 is perfectly protected and the whole damage of the apparatus is reduced to minimum. Moreover, since the head 25 scans only genuine cards in a proper direction scanned by the stripe sensing head 29, the head 25 is free from unnecessary scanning by a wrongly inserted card, so that the wear and tear on the head 25 is minimized. The head 29 and the components associated therewith may be modified to be arranged in a different position in accordance with the position of the stripe 21 of the recording medium.

Figure 5:
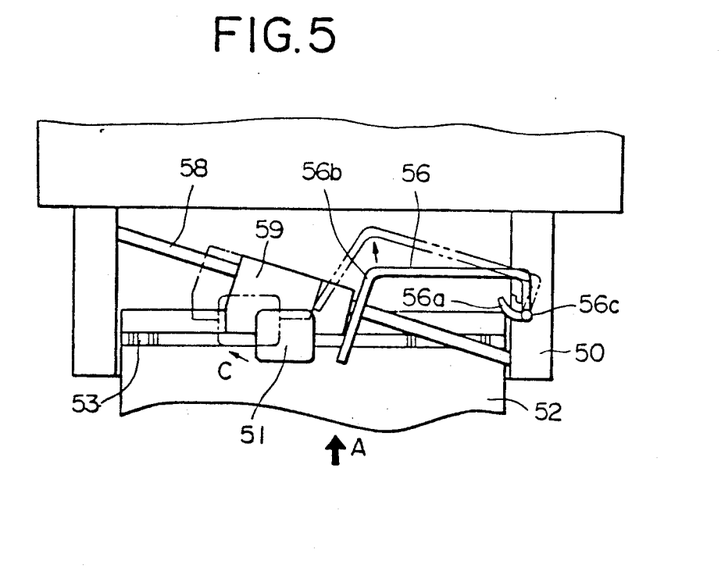
FIG. 5 is a schematic plan view of an apparatus as a second embodiment of this invention.
Figure 6:
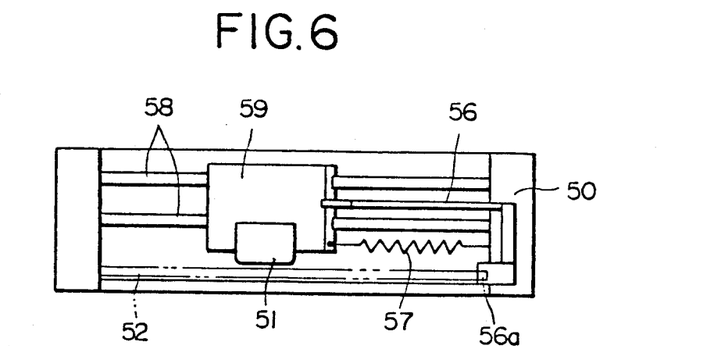
FIG. 6 is a front elevational view of the apparatus of FIG. 5.

Referring to FIGS. 5 and 6 there is shown an apparatus for sensing the magnetic stripe of an inserted card as a second embodiment of this invention, where only a magnetic stripe sensing mechanism section is illustrated and the illustration of the shutter and card data reading sections is omitted for easy explanation. A magnetic head 51 for sensing a magnetic stripe 53 disposed on a recording medium, viz. card 52 is mounted on a movable block 59 which is slidably supported by a pair of guide shafts 58 supported in a slant direction by a frame 50 so that the head 51 may have a movement component perpendicular to the insert direction A of the card 52. A lever 56 is swingably supported at a point 56c by the frame 50. As the card 52 is inserted in the direction A, one end 56a of the lever 56 is pushed by the card 52, so that an actuator portion 56b of the swinging lever 56 pushes the block 59 together with the head 51 in a direction C providing the head 51 with a scanning movement along the stripe 53. When the card 52 is pulled out of or dispensed from the apparatus, the block 59 and the lever 56 are returned to their initial positions by a reset spring 57. Thus, the head 51 scans the stripe 53 in a predetermined portion so as to sense if there is any data on the stripe 53. Since the head 51 is not required to read out card data or contents of the information recorded on the stripe 53, the travel of the head 51 may be short or only a part of the stripe 53. Any head for reading such card data is generally much more complicated and must be disposed with much higher accuracy than the stripe sensing head 51. The magnetic stripe sensing mechanism section of this embodiment may be applied to the apparatus of FIG. 1 by replacing the section 28 therewith. The head 51 is connected with a signal processing electronic circuit which, when a predetermined signal from the head 51 is applied to the circuit, it generates an actuation output signal for application to a controller to open a normally-closed shutter for further card data reading by another magnetic head.

Figure 7:
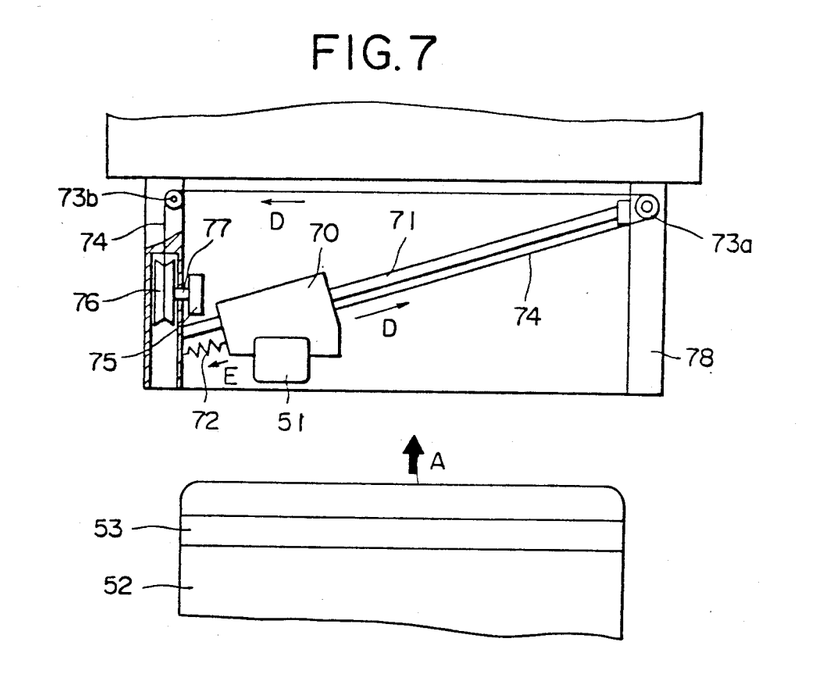
FIG. 7 is a schematic plan view of an apparatus as a third embodiment of this invention.
Figure 8:
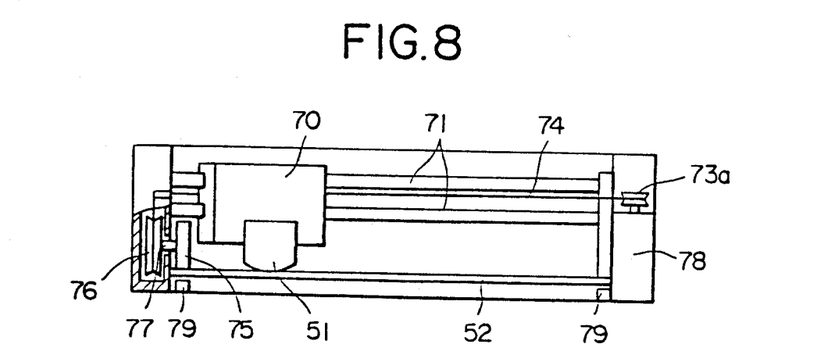
FIG. 8 is a front elevational view of the apparatus of FIG. 7.

In FIG. 7 and FIG. 8 there is shown an apparatus for sensing a magnetic stripe with respect to a magnetic stripe sensing mechanism section thereof as a third embodiment of the invention. Parts which are the same as in the apparatus of FIG. 5 are given the same reference numerals. Magnetic stripe head 51 is mounted on a movable block 70 slidably supported by a pair of slant guide rods 71. The block 70 is biassed by a reset spring 72 in a direction E. A pulley 76 is coaxially fixed to a roller 75 through a shaft 77 rotatably supported by a frame 78, and is wired with the block 70 by a wire 74 via rollers 73a and 73b. As the magnetic card 52 has been inserted into the apparatus so as to rotate the roller 75 by friction coupling therebetween, the wire 74 connected between the block 70 and the pulley 76 via rollers 73a and 73b is wound by the pulley 76 so as to move the block 70 in a direction D. Thus, the head 51 scans stripe 53 of the card 52 supported by a guide member 79 to read predetermined data for sensing the presence of the stripe. As the card 52 is manually pulled out or automatically driven back by a driver (not shown in drawings) after sensing the stripe and further reading or writing on the stripe, the wire 74 is rewound by the reversal rotation of the friction roller 75. Then, even if the roller 75 is further reversely rotated by the removal of the card after return to its initial position thus again winding the wire 74, the block 70 will eventually be returned to the initial position illustrated in FIG. 7 by the spring 72.

Figure 9:
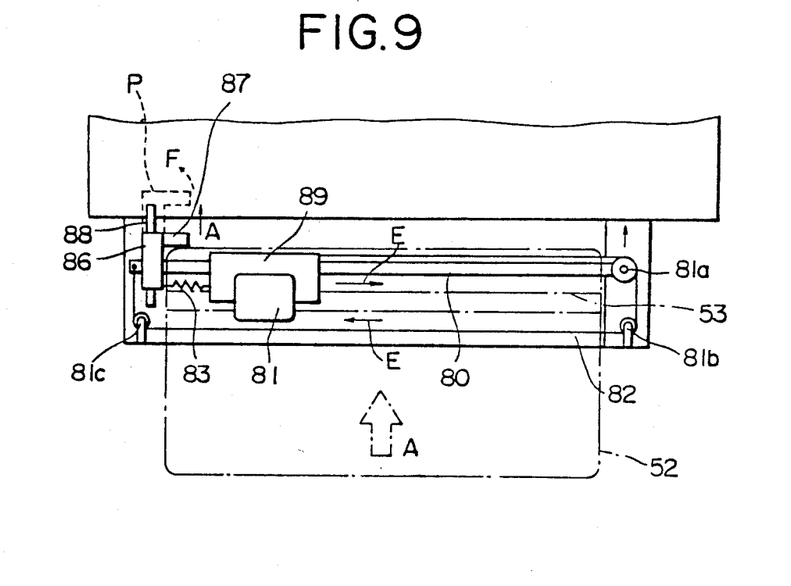
FIG. 9 is a schematic plan view of an apparatus as a fourth embodiment of this invention.
Figure 10:
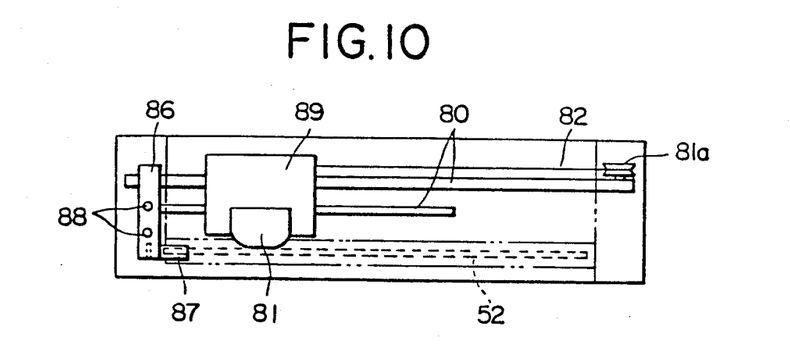
FIG. 10 is a front elevational view of the apparatus of FIG. 9.

Referring to FIGS. 9 and 10, there is shown an apparatus for sensing magnetic stripe 53 of recording medium 52 to illustrate a magnetic stripe sensing mechanism section thereof as fourth embodiment of this invention. FIG. 10 is a front elevational view of the apparatus of FIG. 9 with front rollers 81b and 81c omitted. A movable block 86 is slidably supported by a pair of parallel guide rods 88 so as to move in parallel with the insert direction A of the card 52. The pair of rods 80 at their left-hand ends are fixed to the block 86 so as to move together with the same. On the rods 80 there is slidably mounted a movable block 89 carrying a magnetic head 81. The block 89 is biassed by a reset spring 83 toward the block 86, and is connected with a wire 82 which is connected to the block 86 via a movable roller 81a disposed on one of the rods 82 and stationary rollers 81b and 81c. An actuator lever 87 is swingally mounted below the block 86 though it is restricted so as to be unswingable until it reaches a position P. As the card 52 has been inserted into the apparatus, the card comes into contact with the lever 87 so as to move the lever 87 together with the block 86 along the rods 88 in the direction A. Then, the block 86 moves together with the guide rods 80 and the block 89 in the direction A. The respective distances between the rollers 81a and 81b and between the block 86 and the roller 81c become longer, so that the block 89 moves in a direction E two times as long as the travel of the card 52 after its contact with the lever 87. Thus, the head 81 moves to scan the stripe 53 for a predetermined short travel enough to sense the presence of the magnetic stripe having a general recording density about 75 BPi to 210 BPi. The predetermined short travel of the head 81 is defined by a release position P of the lever 87. Though the lever 87 is restricted by a guide member (not shown in drawings) so as to not swing until the lever reaches the release position P, as the lever 87 is moved beyond the position P in the direction A, the lever 87 is released from the guide member so as to swing in the direction F free from conveying the force by the inserted card to the block 86. Thus, the card 52 is allowed to be forwarded to a further inner position so that the stripe 53 is read out by another card data reader head.

It should be understood that the magnetic stripe sensing head in any of the foregoing embodiments moves along the stripe in response to the movement of the inserted card. Moreover, the respective mechanism of the foregoing embodiments may be modified so that the magnetic stripe sensing head is moved by an electrical drive motor associated with a sensor which is adapted to detect the presence of the card.

Figure 11:
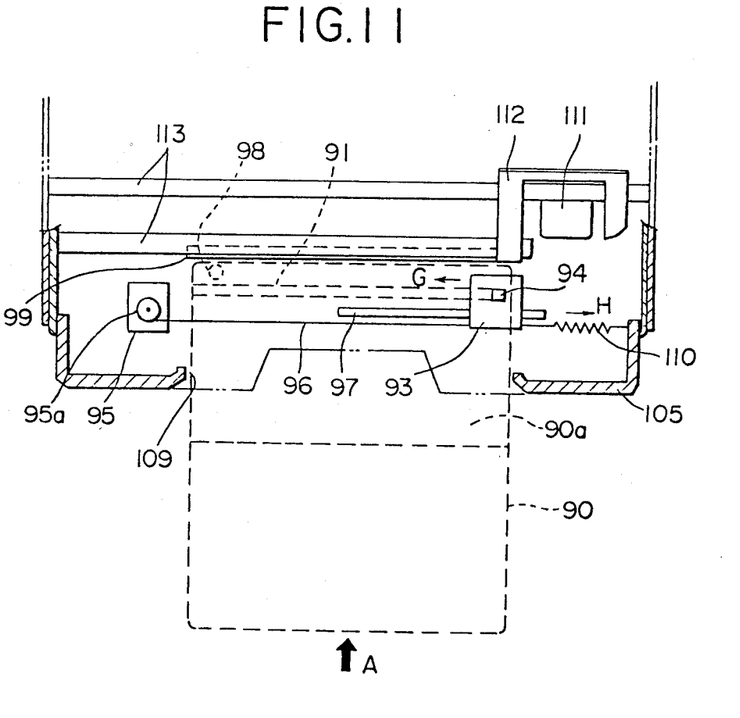
FIG. 11 is a schematic plan view of an apparatus as a fifth embodiment of this invention.

In FIG. 11, there is shown an apparatus for sensing a magnetic stripe 91 of a bank passbook 90, which is employed in an automatic teller machine, as a fifth embodiment of this invention. The passbook 90 is inserted by a bank customer, opened at a page to be printed with the machine. The stripe 91 is stuck to the back cover of the passbook. As the passbook 90 has been manually inserted to a position where it is blocked by a normally closed shutter 99, a photocoupled sensor 98 senses the presence of the passbook so that a drive motor 95 is energized. Then, an output roller 95a of the energized motor 95 winds a wire 96 connected to a movable block 93 which is slidably supported by a shaft 97 having a rectangular section and biassed by a reset spring 110 toward a direction H, so that a magnetic head 94 carried by the block 93 moves in a direction G to scan the stripe 91 for a predetermined travel. Thus, the stripe 91 is sensed by the head 94 and a circuit associated therewith. If a predetermined data or signal from the stripe is read by the head 94, the shutter 99 is opened and the passbook is conveyed to a further inner portion of the machine for succeeding operations which act in the same way as in the apparatus of FIG. 1. A magnetic head 111 for reading the data recorded on the stripe 91 is mounted on a movable block 112 slidably supported by a pair of guide shafts 113, so that the data recorded on the stripe 91 of the passbook passing the shutter 99 is read out by the horizontally moving head 111.

The apparatus in any of the above-described embodiments may be modified such that the card data reader section, such as the section of 25, 26, 27 and 24 of FIG. 1 or 99, 111, 112 and 113 of FIG. 11, is omitted, and whole operations by the apparatus are completed by only the sensing operations of the magnetic stripe by the stripe sensing head, such as the head 29 of FIG. 1, 51 of FIGS. 5 and 7, 81 of FIG. 9 and 94 of FIG. 11.

In the foregoing embodiments, the card or passbook may be replaced by another recording medium having a magnetic stripe, and the arrangement of components of the apparatus for sensing the stripe may be modified so as to be suited for the position of the stripe relative to the recording medium. That is, the mechanism section 28 of FIG. 1 may be arranged on the left-hand side, or opposite that shown in the drawing.

It should be understood that the above description is merely illustrative of this invention and that many changes and modifications may be made by those skilled in the art without departing from the scope of the appended claims.

What is claimed is:

1. An apparatus for sensing a stripe disposed on a flat recording medium which is inserted into the apparatus in a direction perpendicular to the stripe, comprising:
    a first head member,
    supporting means for supporting said first head member for movement having a component perpendicular to the direction of the insertion of said recording medium into the apparatus,
    first driving means in response to the insertion of said recording medium for moving said supporting means so as to move said first head member along said stripe so that said first head member scans the stripe at least in part thereof to sense the presence of the stripe, and
    wherein said first driving means is a mechanism for transferring the mechanical force applied by the inserted recording medium to said supporting means so that the movement of the recording medium is converted into the movement of the magnetic head along said stripe.

2. An apparatus according to claim 1 further comprising normally-closed shutter means for stopping the insertion of said recording medium at a predetermined point, where said first driving means moves in response to insertion of said recording medium, and data reading means disposed behind said shutter means for reading predetermined data recorded on said stripe upon the opening of said shutter means.

3. An apparatus according to claim 1 wherein said head member is supported by said supporting means to move along an arc.

4. An apparatus according to claim 1 wherein said head member is supported by said supporting means to move linearly.

5. An apparatus in accordance with claim 1 wherein said medium is a magnetic medium, and said first head member is a magnetic head.

6. An apparatus in accordance with claim 5 wherein said data reading means further comprises a second magnetic head means for reading data on said magnetic stripe.

7. An apparatus for firstly determining whether or not first predetermined data is recorded on a card containing a stripe and, secondly, for reading data recorded on said magnetic stripe comprising in combination:
    means for receiving said card into said apparatus where said card is inserted in a direction perpendicular to the longitudinal axis of said stripe;
    first means for reading identification from said stripe;
    a shutter means located behind said means for receiving which is open when said predetermined data is read from said stripe by said first reading means; and
    second means for reading data from said stripe located behind said shutter means.

8. The apparatus of claim 7 wherein said first means for reading identification is operated by transferring the mechanical force applied by the inserted recording medium to said supporting means so that the movement of the recording medium is converted into movement of the magnetic head along said stripe.

9. The apparatus of claim 7 further including a motor driving means coupled to said second means for reading data for moving said second means for reading data.

10. The apparatus of claim: 1 further including means for detecting the size of said card and for permitting said shutter to open when a predetermined size is detected.

11. The apparatus of claim 7 further including means for detecting the size of said card and for permitting said shutter to open when a predetermined size is detected.

12. The apparatus of claim 7 wherein said medium is a magnetic medium, said first means for reading is a magnetic head, and said second means for reading is a magnetic head.

13. An apparatus for sensing a stripe disposed on a flat recording medium which is inserted into the apparatus in a direction perpendicular to the stripe, comprising:
    a first head member,
    supporting means for supporting said first head member for movement having a component perpendicular to the direction of the insertion of said recording medium into the apparatus,
    first driving means in response to the insertion of said recording medium for moving said supporting means so as to move said first head member along said stripe so that said first member scans the stripe at least in part thereof to sense the presence of the stripe, and
    detecting means for detecting the insertion of the recording medium and a motor driving means coupled with said detecting means for moving said supporting means.

14. An apparatus in accordance with claim 13 further comprising normally-closed shutter means for stopping the insertion of said recording medium at a predetermined point, where said first driving means moves in response to insertion of said recording medium, and data reading means disposed by said shutter means for reading predetermined data recorded on said stripe upon the opening of said shutter means.

15. An apparatus in accordance with claim 14, wherein said medium is a magnetic medium, and said first head member is a magnetic head.

16. An apparatus in accordance with claim 15, wherein said data reading means further comprises a second magnetic head means for reading data on said magnetic stripe.

* * * * *